United States Patent
Braksator et al.

(10) Patent No.: US 10,938,827 B2
(45) Date of Patent: *Mar. 2, 2021

(54) AUTOMATICALLY PROVISIONING NEW ACCOUNTS ON MANAGED TARGETS BY PATTERN RECOGNITION OF EXISTING ACCOUNT ATTRIBUTES

(71) Applicant: International Business Machines Corporation, Armonk, NY (US)

(72) Inventors: Mark J Braksator, Riverside, CA (US); Soke-Wan Chua, Monument, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,002

(22) Filed: Jul. 9, 2019

(65) Prior Publication Data

US 2019/0334915 A1 Oct. 31, 2019

Related U.S. Application Data

(63) Continuation of application No. 15/892,566, filed on Feb. 9, 2018, now Pat. No. 10,397,237, which is a continuation of application No. 14/863,981, filed on Sep. 24, 2015, now Pat. No. 9,979,733.

(51) Int. Cl.
*H04L 29/06* (2006.01)

(52) U.S. Cl.
CPC ............ *H04L 63/102* (2013.01); *H04L 63/20* (2013.01)

(58) Field of Classification Search
CPC ...... H04L 63/102; H04L 63/104; H04L 63/20
See application file for complete search history.

(56) References Cited

U.S. PATENT DOCUMENTS

| | | | |
|---|---|---|---|
| 6,239,802 B1 | 5/2001 | Lahey | |
| 7,574,413 B2 * | 8/2009 | Larson | G06Q 10/10 706/47 |
| 7,941,785 B2 | 5/2011 | Cole | |
| 8,857,705 B2 | 10/2014 | Larson | |

(Continued)

OTHER PUBLICATIONS

Web page entitled "Attribute value pattern matching" found as of Apr. 7, 2015 on http://www.acrobatfaq.com/atbref46/index/AgentQueries/Attributevaluepatternmat.html.

(Continued)

*Primary Examiner* — Catherine Thiaw
(74) *Attorney, Agent, or Firm* — Jeffrey S LaBaw; John C Kennel; Diana R Gerhardt

(57) ABSTRACT

An identity management system is augmented to provide for automated provisioning of user accounts. A user account is autoprovisioned based on detected attribute patterns. A set of existing account information is retrieved. A software module resident in a computer memory performs pattern matching on the retrieved set of existing account information to extract attribute information in the retrieved set of existing account information and on the extracted attribute information to discover a first attribute pattern. Next, an account template is generated according to the discovered attribute patterns. Using the generated account template, a new account on the first target is created giving the first user access to the target.

20 Claims, 8 Drawing Sheets

(56) References Cited

U.S. PATENT DOCUMENTS

| | | |
|---|---|---|
| 8,904,355 B2 | 12/2014 | Channamsetti |
| 9,043,870 B1 | 5/2015 | Barenholz |
| 2003/0055684 A1 | 3/2003 | Jaskolski |
| 2003/0145074 A1 | 7/2003 | Penick |
| 2004/0205525 A1* | 10/2004 | Murren ................. G06F 40/174 715/226 |
| 2006/0168509 A1* | 7/2006 | Boss ..................... G06F 40/174 715/226 |
| 2007/0043716 A1 | 2/2007 | Blewer |
| 2007/0266133 A1 | 11/2007 | Bukovec |
| 2008/0046433 A1 | 2/2008 | Kool-Brown |
| 2008/0126945 A1* | 5/2008 | Munkvold ............. G06Q 10/06 715/733 |
| 2009/0124350 A1 | 5/2009 | Iddings |
| 2012/0036053 A1* | 2/2012 | Miller .................. G06Q 40/123 705/31 |
| 2012/0209926 A1 | 8/2012 | Backholm |
| 2013/0019276 A1 | 1/2013 | Biazetti |
| 2013/0198824 A1 | 8/2013 | Hitchcock |
| 2013/0262277 A1 | 10/2013 | Clark |
| 2013/0268953 A1 | 10/2013 | Nikankin |
| 2014/0278579 A1* | 9/2014 | Mojahed ................ G06Q 40/08 705/4 |
| 2014/0280939 A1 | 9/2014 | Bantawala |
| 2014/0325623 A1 | 10/2014 | Johansson |
| 2015/0026027 A1 | 1/2015 | Priess |
| 2015/0169207 A1 | 6/2015 | Mody |
| 2016/0019266 A1 | 1/2016 | Katsunuma |

OTHER PUBLICATIONS

Web page entitled "Using expressions and scripts" found as of Apr. 7, 2015 on http://documentation.bonitasoft.com/using-expressions-and-scripts.

IBM Atents or Patent Applications Treated as Related.

* cited by examiner

AUTOMATICALLY PROVISIONING NEW ACCOUNTS ON MANAGED TARGETS BY PATTERN RECOGNITION OF EXISTING ACCOUNT ATTRIBUTES

BACKGROUND

Technical Field

This disclosure relates generally to the field of digital resource access, and more particularly, to automatically provisioning account access to digital resources.

Background of the Related Art

Identity and Access Management Governance is a set of processes and policies for organizations to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not. This type of program often assists an organization's compliance to government regulations, industry-specific regulations (SOX, HIPPA, GLBA, etc.), and business regulations and guidelines. Typically, IAM Governance includes processes for accessing request governance, entitlement certifications, reports and audits, and analytics and management (including role management, entitlement management, separation of duties enforcement, and privileged identity management). An end-to-end JAM Governance solution may also provide related functions, such as access enforcement, user provisioning, password management, and user lifecycle management.

Identity and access management (IAM) systems protect enterprise data and applications with context-based access control, security policy enforcement and business-driven identity governance. These systems may be operated in a standalone manner, in association with cloud-based environments, or in hybrid environments. Provisioning is the process that IAM systems use to grant users access to the digital resources within the enterprise for which a given user is entitled, often due to the role of the user within the enterprise, or a group of users to which the user belongs.

Many identity and account management systems have built-in capabilities to automatically provision (or "autoprovision") accounts on managed targets. However, such autoprovisioning solutions do not work "out of the box" without significant user intervention. They typically require a team of system administrators to specify in advance the format for all default values for accounts of the given target type or a specific target. This process is typically done in-situ by a group of system analysts and system administrators. It may take many days and delay the deployment of the IAM system.

It would be highly desirable to ameliorate or eliminate the time required for the autoprovisioning process of IAM systems without at the same time increasing security risks associated with such activities.

BRIEF SUMMARY

According to this disclosure, an identity management system is augmented to provide for automated provisioning of user accounts. A user account is autoprovisioned based on detected attribute patterns. A set of existing account information is retrieved. A software module resident in a computer memory performs pattern matching on the retrieved set of existing account information to extract attribute information in the retrieved set of existing account information and on the extracted attribute information to discover a first attribute pattern. Next, an account template is generated according to the discovered attribute patterns. Using the generated account template, a new account on the first target is created giving the first user access to the target.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

The proposed system will analyze existing account information automatically by utilizing the data available in an IAM system such as existing account data, including account groups and account owners, policies such as UID policies, provisioning policies and password policies to determine patterns in such data. The detected patterns are then used to generate account templates which preferably include script expressions to provide the autoprovisioning function. Thus, the user is not required to manually discover and predefine account attribute defaults to enable autoprovisioning on a newly added managed target. Using the automatically discovered patterns of values, the system generates a template used for required account attributes. In some preferred embodiments, the templates with the discovered patterns are stored in an account template store for future use. Alternatively, the template is used as a transient account template during auto-provisioning.

In some preferred embodiments, the system administrator has the flexibility to override the default dynamic generation of some or all required attributes with statically defined, persistent values within an account template. In one preferred embodiment, the system administrator directs the template generation process to look for patterns in selected account attributes, defining the remaining attributes with statically defined input. The administrator input can be a statically defined value, or it can be an expression which is evaluated at runtime. In other embodiments, patterns are determined for all of the attributes, but the system administrator has the option of inspecting the generated patterns in a user interface, and overriding those selected patterns, e.g., patterns known to the administrator to be ineffective. Data patterns discovered on one target may be used on a newly deployed target of the same type with no existing account data.

Figure 1:
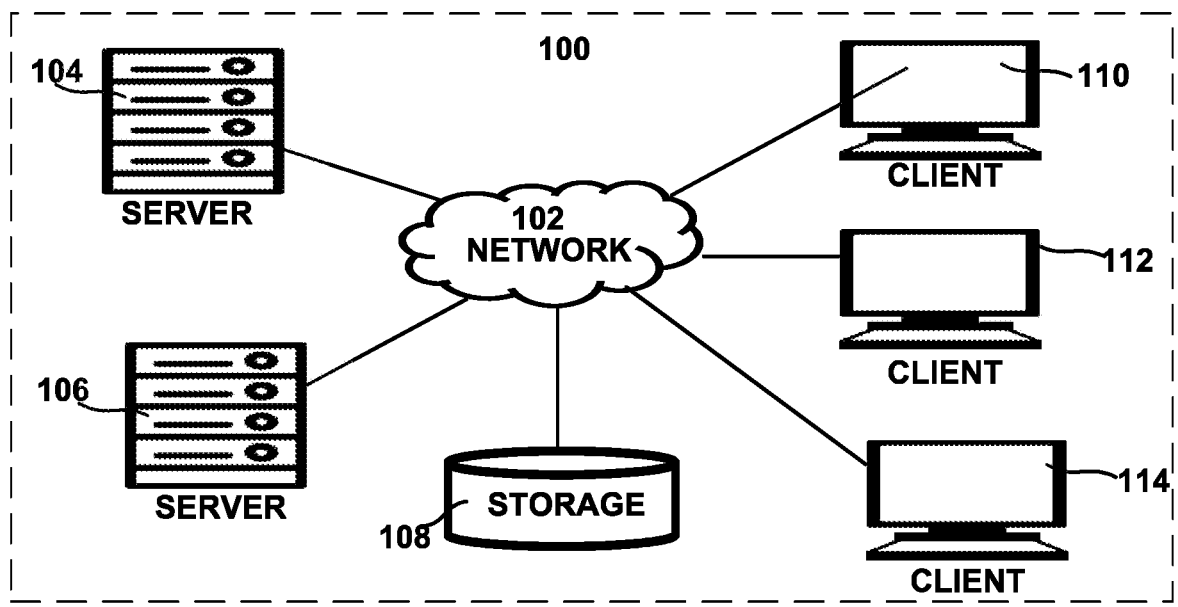
FIG. 1 depicts an exemplary block diagram of a distributed data processing environment in which exemplary aspects of the illustrative embodiments may be implemented.
Figure 2:
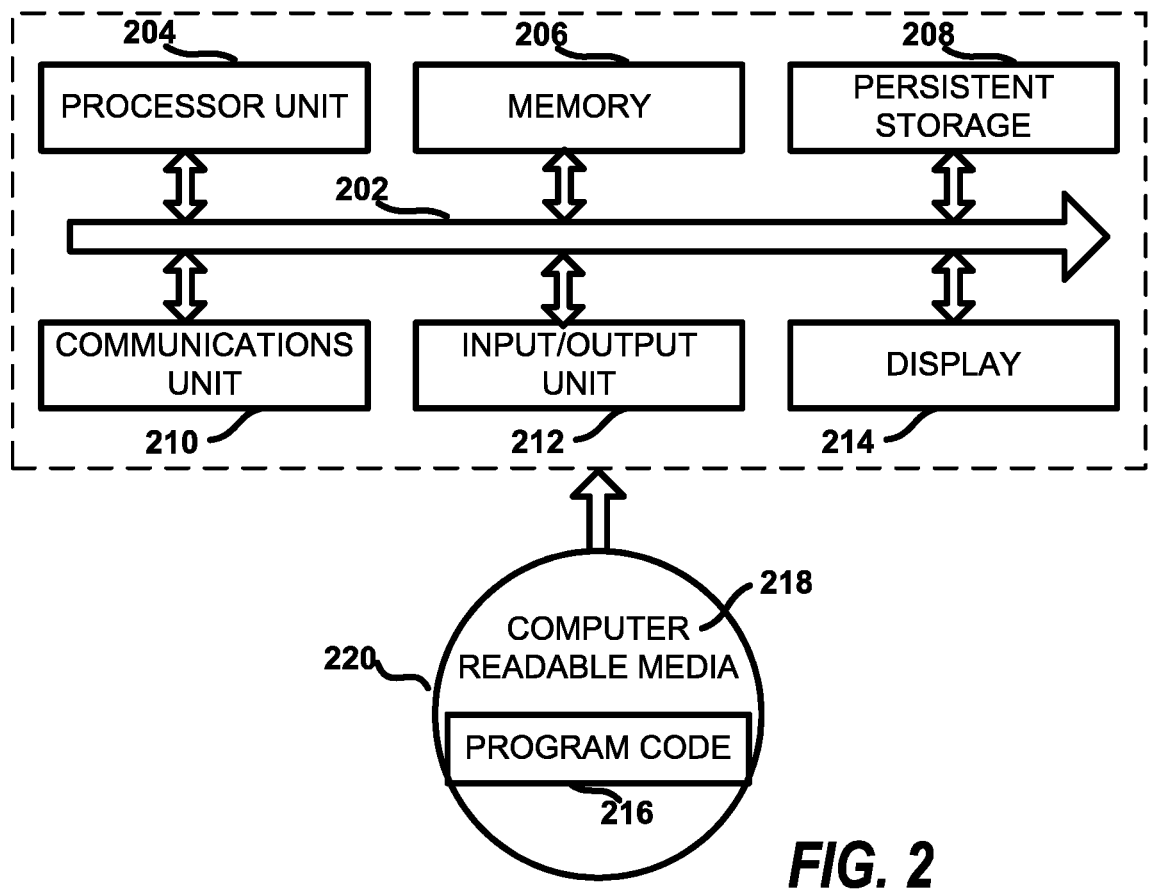
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Identity and Access Management

As used herein, an "account" typically refers to an entity that contains a set of parameters that define attributes of a principal, which include the identity, user profile, and credentials. In some cases, the attributes may be application or target specific. An "account template" as used in the present invention contains a collection of expressions needed to generate the account attributes for a new account request. Some of the expressions may be located in separate templates or policies to provide other functions in the system as well as being aggregated into a single account template.

"Access" refers the ability to read, update, delete, or otherwise use a resource. Access to protected resources is typically controlled by system software.

A "credential" refers to a declaration of authorization or other security attributes of a subject that is typically validated and signed by a trusted third party. Typically, a credential represents the ID and authenticators (such as a password) for a resource.

An "entitlement" refers to a capability-based reason that a user is given a permission or set of permissions to access IT resources (services).

An "identity" refers to a subset of profile data that uniquely represents a person or entity and that is stored in one or more repositories.

An "ownership type" refers to a category that classifies ownership accounts. One account preferably can have only one type of ownership. Accounts can be marked with different ownership types depending on their use. Default ownership types include, for example, device, personal, system, and vendor.

A "person" is an individual in the system that has a person record in one or more corporate directories.

A "policy" is a set of considerations that influence the behavior of a managed resource or a user. There may be separate policies for each facet of the process by which access is granted to a protected resource. For example, "password policies" may govern the format, longevity and other attributes of user passwords. "Identity policies" can govern how principals are identified within a specific account. A UID policy is a special type of identity policy which governs how the UID is generated for a specific account. In the invention, policies can be used to generate an expression in the account template.

A "principal" is a person or group that has been granted permissions. It also refers to an entity that can communicate securely with another entity.

In identity management, "provisioning" refers to the process of providing, deploying, and tracking a service or component. To "provision" means to set up and maintain the access of a user to a system, or to create an account on a managed resource. "Autoprovisioning" refers to a provisioning process in which most, if not all, of the provisioning processes are automatically performed by the JAM system in response to a user request for protected enterprise digital resources.

A "provisioning policy" is a policy that defines the access to various managed resources (services), such as applications or operating systems. Access is granted to all users, users with a specific role, or users who are not members of a specific role.

A "resource" is a hardware, software, or data entity.

A "role" is a logical group of principals that provide a set of permissions. Access to resources is controlled by using provisioning policy to grant access to a role. A role can also represent a group of principals based on business job title or other business-related attributes.

A "service" is a representation of a managed resource, application, database, or system. In an identity management system, typically a service represents the user repository for a managed resource.

A "user" is an individual, organization, process, device, program, protocol, or system that uses the services of a computing system. For example, a user is an individual who uses the identity management system to manage their accounts and passwords, or that is managed by the system.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative function that utilizes a system to identify individuals with a role, membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions helps companies automate the process of provisioning employees, contractors, and business partners with access rights to the applications they need, whether in a closed enterprise environment or across a virtual or extended enterprise. A known product of this type is IBM® Security Identity Manager. Another related IBM product is IBM® Security Identity Governance. Other products of this type are SailPoint IdentityIQ, RSA Identity and Access Management and Oracle Identity Manager.

Figure 3:
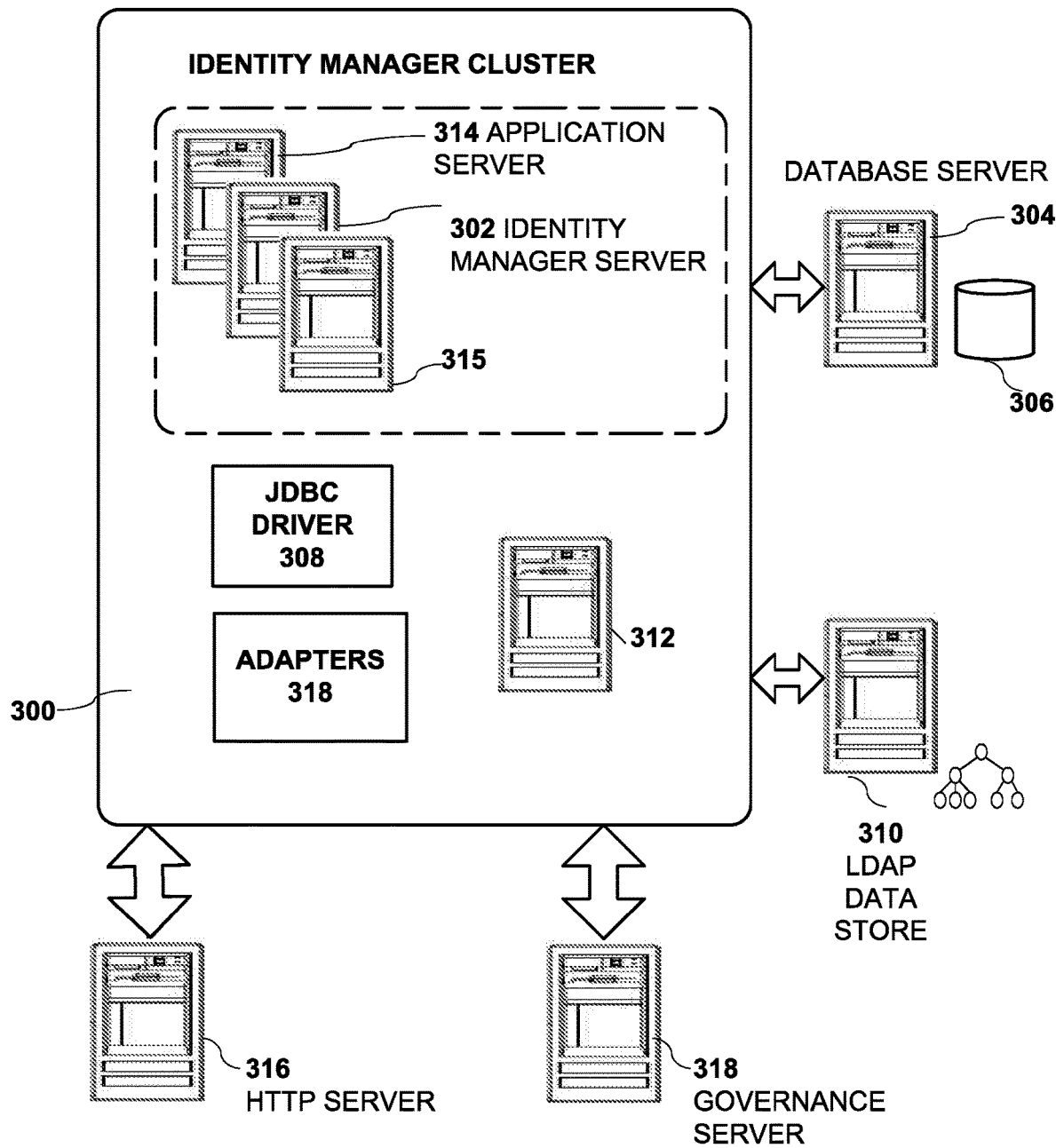
FIG. 3 is a representative security identity management system in which the disclosed subject matter may be implemented.

FIG. 3 is a block diagram of a commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. As will be described in more detail below, the solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. For example, the database products used could be IBM DB2® Database, Oracle DB, or MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server.

The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager 315 that manages the cluster. The solution also typically includes an HTTP server and WebSphere Web Server plug-in 316. An HTTP server provides administration of IBM Security Identity Manager through a client interface in a web browser.

Optionally, the embodiment of the invention could include an Identity Governance Server 318 such as IBM Security Identity Governance. The Identity Governance Server 318 helps organizations to mitigate access risks and separation of duties violations with business-driven identity governance and broad user lifecycle management capabilities. It provides role mining capabilities and separation of duties monitoring across an enterprise.

Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

The JDBC driver 308 and Adapters 318 are shown as respective elements in the drawing, however, those skilled in the art would recognize that they would often be co-resident in the depicted systems in which the various applications are also resident. Likewise, although the drawing shows each application in its own respective server system, those skilled in the art would recognize that the software applications could be resident in the same server system depending on the capabilities of the system hardware and the demands made on the Identity Manager Cluster 300.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Figure 4:
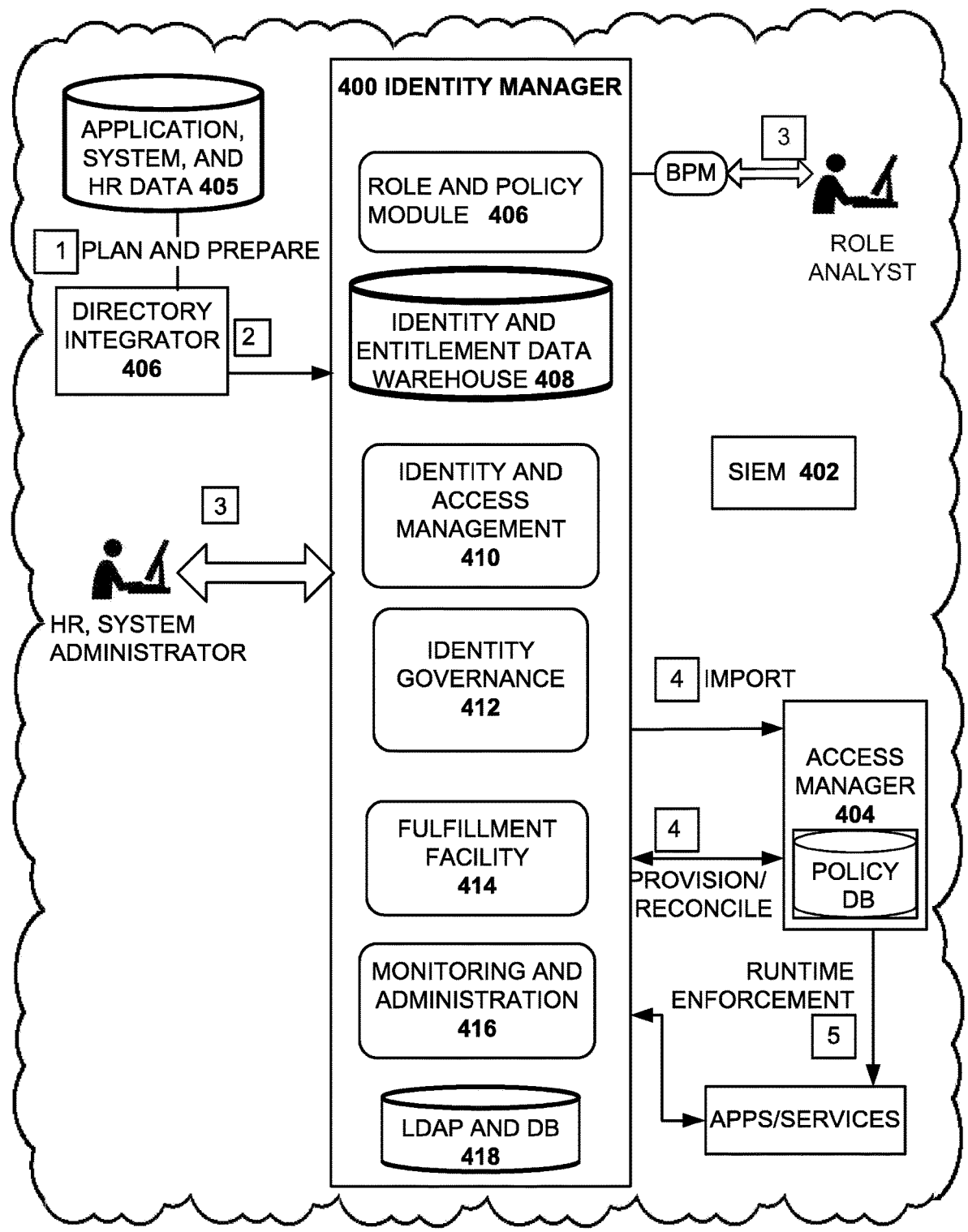
FIG. 4 illustrates a step-by step-guide for implementing IAM governance using an Identity and Access Management system.

FIG. 4 illustrates a representative step-by step-guide for implementing IAM governance using an Identity and Access Management system 400 such as IBM Security Identity Manager. In this embodiment, an end-to-end solution is provided in association with several other systems including a Security Information and Event Management (SIEM) software system 402 (e.g., IBM QRadar®), and an access and entitlement enforcement system (e.g., IBM® Security Access Manager) 404.

At step (1), the enterprise identifies the resources 405 that it wants protected and the accesses it wants certified and monitored. The data is cleaned, filtered, and prepared for loading into the Identity and Access Management system 400 through a directory integrator 406. Alternatively, an LDAP Feed, flat files (CSV, DSML, etc.), or API could be used. At step (2), the data may be loaded into a role and policy module 406 for modeling and management. This data can come from various sources: Human Resources (HR), a planning and modeling tool, or manual entry. In a typical use case, the data gathered during planning is saved (e.g., in a standard CSV file) and then imported into IBM Security Identity Manager for role and policy modeling. The system can export the modeled role and entitlement data (e.g., in XML format) and load it for lifecycle management and certification. The account and entitlement data can be stored in Identity and Entitlement Warehouse 408. At step (3), stakeholders and participants can use the Identity and Access Management system 400 for the various tasks that they must perform, such as requesting accesses and roles, approving access and role requests, certifying, managing, and modeling roles, and reviewing and certifying roles and entitlements. The certification data can be used to clean, adapt, and evolve the system. At step (4), the access and entitlement enforcement system 404 imports or provisions the data from Identity and Access management system 400 into the access and entitlement enforcement systems. At step (5), the enforcement system 404 uses the certified data for runtime enforcement. The SIEM system 402 monitors actual user activity and provides feedback to fine-tune access policy planning, administration, and enforcement at step (6).

As illustrated in FIG. 4, one of the responsibilities of the Identity and Access Management system 400 is to provide initial and periodic access certification for continued business needs to help direct and control operations. Access certification typically includes review and certification of user access assignment via role or direct assignment to determine who received access to what, when, and why. It ensures that users have only the privileges and exception entitlements they need to perform their job. Access certification can also be used to detect policy violations, access anomalies, and orphan and dormant accounts. The IAM system typically also maintains certification and access change history, which aids the certification and audit processes. Other functions performed by the Identity and Access Management Module 410 include role and separation of duties management, user role assignment, password management, user profile management, and account management. Some of these functions can be alternatively, or cooperatively performed by the Identity Governance Module 412.

The system also supports the creation of new accounts in response to user access to a target resource or multiple target resources. In response to add a new user account to the enterprise, an access fulfillment facility 414 queries an identity warehouse 408 for a variety of information about the user as well as the target resources. After receiving this information, the access fulfillment facility creates the user account for the target resources. Alternatively, some or all of the user information can be input in a user interface or the other sources mentioned above. In one preferred embodiment, the access fulfillment facility 414 has subcomponents (not pictured) which perform specific tasks in the overall account creation process. The fulfillment authority queries an account authority for account templates which may contain default values for user accounts at a specific target resource. The fulfillment authority also queries a password policy authority for password information, including an account password, a UID policy authority for an account UID and a group/role authority for the groups and roles appropriate for the new user. The password, UID and group authorities may keep the information locally, or alternatively may request information from the Identity Warehouse such as password policies and UID policies. Other information which can be obtained from the Identity Warehouse 408, either by the fulfillment facility 414 or a subcomponent, include information about account templates for the target, user account data (including that for other target resources) and a service profile.

The gathered information can be combined by the fulfillment authority to create the user account for the desired target. In one preferred embodiment, this is accomplished within an 'Attribute Pattern Discovery' component of the fulfillment authority. In the invention, preexisting account information for other users and/or for other targets is analyzed so that a new account template for the user/target combination such that the user information associated with the request can be added to the newly created template to create the user account for the desired target. A reconciliation process is a process typically triggered on periodic basis to make sure that the identity solution is made aware of all account and group additions, updates and deletions happening on managed remote resources.

Though not essential to the invention, the Monitoring and Administration component 416 performs functions such as anomaly detection, reporting on anomalies and lifecycle automation. The LDAP and DB component 418 can be used as an additional store of IAM information, either replacing or augmenting the Identity Warehouse 408.

Analyzing Existing Account Information

With the above as background, the subject matter of the preferred embodiments of the invention is now described in greater detail. An identity management system is augmented (i.e. extended or supplemented) to provide for automated creation of new user accounts with a minimum of preparation by the system administrators. The proposed system will analyze existing account and/or policy information automatically, utilizing existing data already available in an IAM system. In one preferred embodiment, the following information is gathered from the identity warehouse component of the IAM system:

1. Target metadata
2. Existing target instances
3. Existing accounts
4. Account groups
5. Account owner
6. Uid policies
7. Provisioning policies
8. Password policies In other embodiments of the invention, this information can be stored in other components of the IAM system, and other types of identity information, or a subgroup of the above list is gathered. In other embodiments of the invention, other types of account information which would be useful in some environments such as account adoption policies are gathered. An adoption policy matches the attributes for an account on a managed resource to the attributes for a user for the purposes of identifying an owner of an orphan account.

Using the gathered information, patterns are detected in the previously created user accounts. The target metadata, existing target instances, existing accounts, account groups and account owner all can contain useful pattern data. The policy information can be used to determine whether a detected pattern is applicable to the new user or new target. The policy information itself may contain patterns that can be included in the generated account template. The detected patterns are then used to generate templates. In one preferred embodiment, the generated templates include script expressions to provide the autoprovisioning function. The script expressions are evaluated at runtime to determine values for provisioning parameters for the new account. Although in the examples below, JavaScript is used to define the script expressions, those skilled in the art would appreciate that any computer language that includes expressions that can be interpreted at runtime could be used in the invention.

Thus, the system administrator is not required to manually predefine account attribute defaults to enable autoprovisioning on a newly added managed target. Using the automatically discovered patterns of values, the system generates an account template used for at least one required account attribute in the new account. In some embodiments, the discovered patterns are used for all the account attributes, that is, an account template which includes all dynamically defined account attributes. In some preferred embodiments, the templates with the discovered patterns are stored in an account template store for future use with other user account requests. In other embodiments, the template is used as a transient account template during autoprovisioning the new user(s) to the new target(s) but is not stored for future provisioning operations.

In some preferred embodiments, the user administrator has the flexibility to override the default dynamic generation of some or all required attributes with statically defined, persistent values or administrator written expressions within an account template. Data patterns discovered on one target may be used on a newly deployed target of the same type with no existing account data. Data patterns discovered for other users on the target may be used to provision new users.

Figure 5:
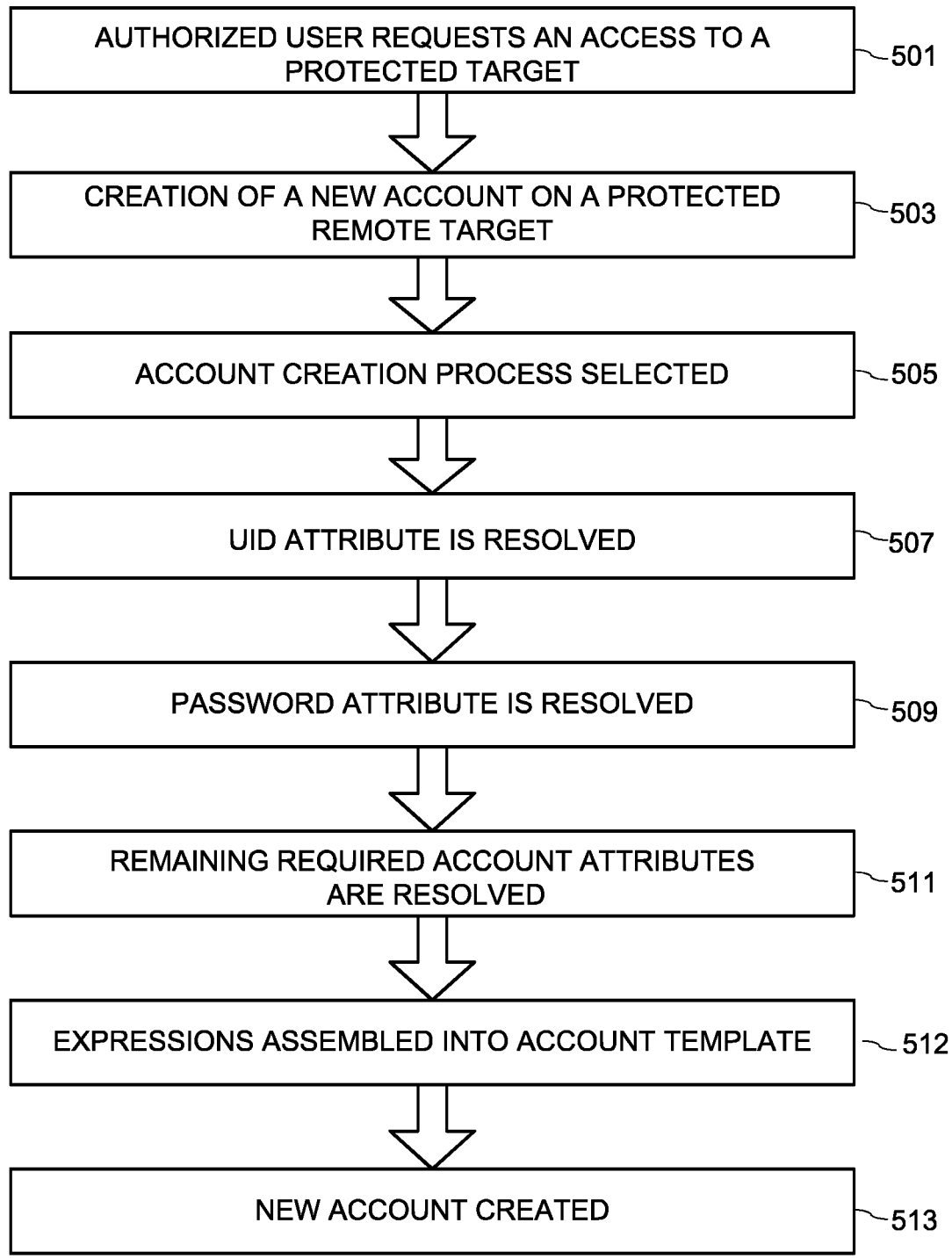
FIG. 5 depicts a process flow of the basic technique of this disclosure.

It is assumed that auto-provisioning is part of a larger Identity and Governance Administration (IGA) system, such as depicted in FIGS. 3 and 4. In such system, there is usually an identity warehouse component containing information about the organizational structure, all users within the organization, user roles and user entitlements. In such system, granting an access to a user often necessitates the automatic creation of a new account for that user on a remote system. Granting user an access through account auto-provisioning involves the following basic steps as depicted in the flow diagram shown in FIG. 5.

In step 501, an authorized user requests an access to a resource which is protected by the IAM system. The system determines that access will require a creation of a new account on the resource, i.e. the target, step 503. Potentially, the target may be a newly discovered remote target for which accounts have not previously been established. In other cases, the target is one for which other users have been granted access. In step 505, the ADP process within the IAM system resolves how the account should be created. The process for creating the account will depend on the target system and target application requirements, and may also depend on user characteristics such as group membership and role within the enterprise. For example, if the new target is a Linux system, the ADP process will search for existing account information for other Linux systems. The pattern recognition system may have already recognized a "Linux system" pattern and can use the existing pattern as a first try for the retrieved account information.

Pattern recognition or pattern matching is a known technology in the computing arts. It is the act of checking a given sequence of tokens, e.g., in a file, for the presence of some pattern in which the tokens are arranged. In the context of the present invention, there are two types of pattern matching and recognition which occur. As will be discussed below, in a preferred embodiment of the invention, special rules are used to create the account template. The first pattern recognition occurs using the retrieved account information to identify the special information within the account information which pertains to the user associated with the account, e.g., the user name for the account. In one preferred embodiment, this operation is aided by knowledge of the format of the account information for the given target; the format for the account information for a Linux machine will differ from that of a mainframe. The knowledge can be input by a system administrator, or in one preferred embodiment, by a machine learning program. The second type of pattern recognition occurs with the special information itself, i.e. once it has been extracted. Thus, for example, in the second operation, a pattern is identified in the way that the user name(s) retrieved in the first operation are formatted. For example, a set of user names, jtaylor, kclark and zbrenivs, can be analyzed and compared with the actual user names of the users to detect a pattern of use, i.e. the first letter from the first name of the user and the first seven letters of the second name of the user are concatenated to form the user name in the account information.

In step 507, the UID attribute is resolved. In one embodiment, this is accomplished using a UID policy applicable to target which is stored in the identity warehouse or another IAM component. In this embodiment, the password attribute is resolved via a password policy applicable to the target, the user or the target/user combination in step 509. This embodiment is an example of the patterns for the UID attribute and password being found respectively in the UID and password policies. The remaining required account attributes, if any, are resolved in step 511. In one preferred embodiment, this step is accomplished using a combination of statically and dynamically defined account attributes applicable to the target, user or target/user combination. In other embodiments, all of the required account attributes are determined dynamically by the pattern recognition process of the present invention. The determined patterns are converted into expressions and assembled into the account template, step 512. Note that some of the elements of the account template are also used as policies, e.g., the password and UID policies.

Thus, in some embodiments of the invention, the determined patterns can be used to create policies in addition to the account template and new account. For example, "provisioning policies" govern the accounts and access that are authorized to users or automatically provisioned for users by the user's role. A provisioning policy can be used to support role-based provisioning, in which accounts and access are automatically provisioned to a user, based on the user's roles. Provisioning policies are important to support security compliance. An embodiment of the present invention can be used to create a provisioning policy for a new target based on the provisioning policies found on existing targets. The existing provision policies are filtered for user roles similar to those possessed by the user requesting accounts on the new target. These filtered provisioning policies are analyzed for patterns which are used to generate a provisioning policy for the new target for the new roles. Optionally, a user interface can be provided so that the administrative user can view and modify, if needed, the created provisioning policy. The provisioning policy is typically a separate entity from the new account information.

In one preferred embodiment, the created account template is presented to the system administrator for an opportunity to edit or otherwise override the dynamically created script expression, or the statically defined account attribute which may have been defined in a previous step in the process.

Finally, in step 513, the new account is created using the created account template. In one preferred embodiment, the Fulfillment Authority component of the JAM sends a 'create account' request containing a set of all required new account values to a target brokerage service or identity adapter. In some JAM systems, a brokerage service processes requests related to accounts present on remote resources. In other IAM systems, such as IBM Security Identity Manager, adapters are used to process account requests to specific applications.

Next, the disclosure focuses on the technique used to discover values for new account attributes within the 'Attribute Pattern Discovery' component. Assuming that a new Linux server, i.e. a new target, is reconciled and managed via an identity management solution such as IGA, creating a new account on this newly managed target requires the following set of attributes:

1. User id—system required
2. Primary group—admin required
3. gecos (user name, email, phone number, etc.)—admin required
4. home directory—admin required
5. shell script—admin required
6. Password—system required
7. Set of secondary groups—optional—granting access on the resource—required by user's organizational role Those skilled in the art would appreciate that other target systems will have different sets of target account attributes, which will include similar though not identical attributes to the Linux example. The example is for purposes of illustration only.

In most IAM systems, the password rules cannot be discerned automatically merely by examining existing passwords, but in this example, it is assumed that they were already generated according to organizational guidelines and stored in a global password policy within the identity management solution during its deployment. The values for the first five attributes in the example above may be discovered dynamically by analyzing the existing account information imported into the identity warehouse during new service reconciliation process.

Figure 6:
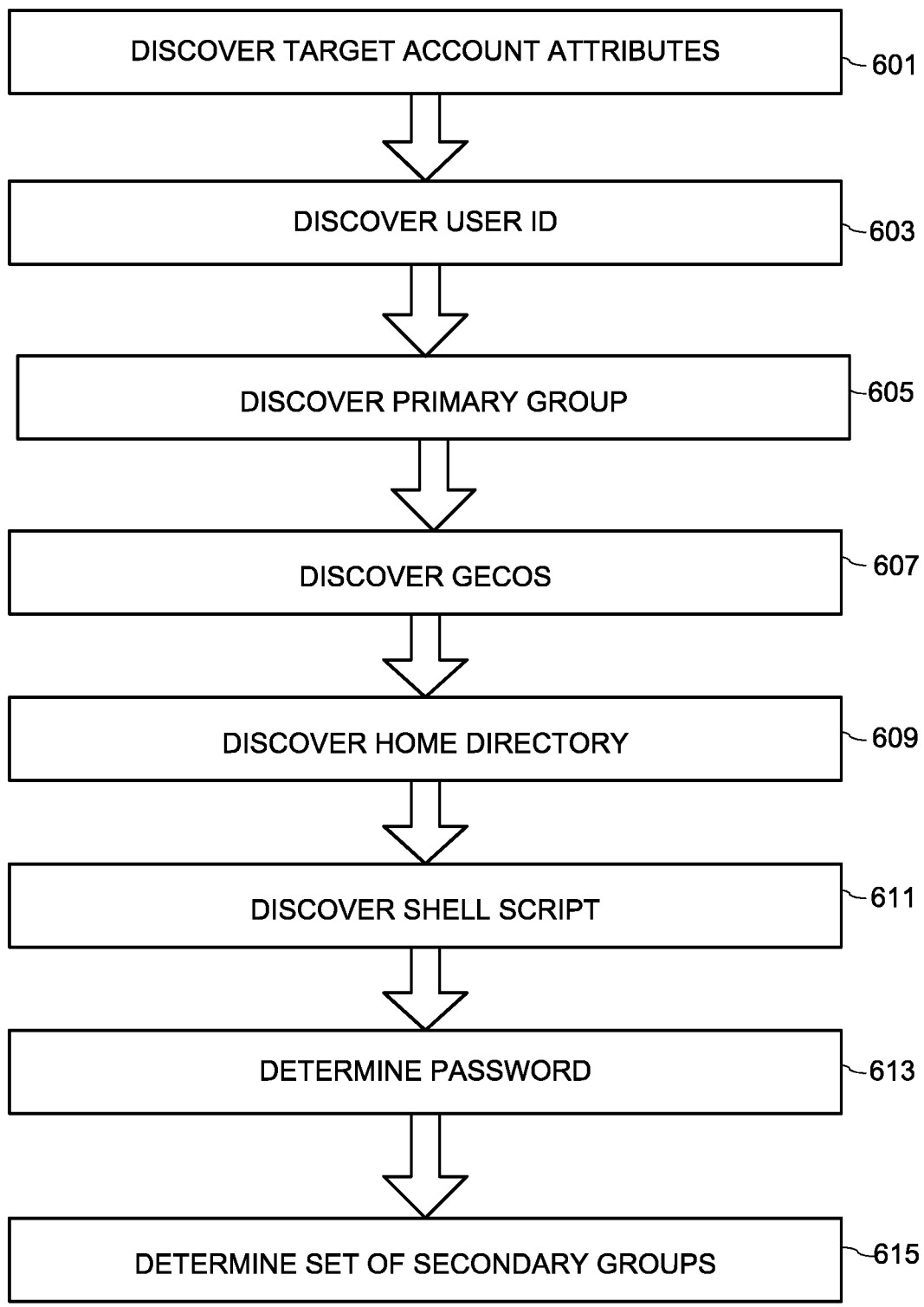
FIG. 6 is a process flow of a preferred embodiment for determining the account information for a Linux target.

A process for discovery of Linux account information is shown in FIG. 6. In step 601, the discovery process begins. In a preferred embodiment, each of the discovery steps uses certain rules to discover the needed account attribute pattern for each type of account attribute. In one embodiment, these rules are retrieved from a store of rules, so that new rules can be flexibly added to the APD process. One type of rule is a target specific rule, so when access is requested to a target of a particular type, a lookup is performed to determine whether there is a target specific rule for the target type. In another embodiment, the rules are hard coded into the APD process. In yet another embodiment of the invention, some of the target specific rules are added by the APD process in response to successful pattern recognition in prior requests. In step 603, the User id which is system required is resolved using the UID policy retrieved from the identity warehouse. The primary group is discovered in step 605. The primary group is admin required and is where Linux will store files created by the user. In one preferred embodiment, it is dynamically discovered by examination of a preexisting account, however, in other embodiments of the invention it can be statically defined in an account template. In step 607, "gecos" is determined. In Linux, the gecos field is an entry in the /etc/passwd file and contains general information about an account or user, e.g., user name, email, phone number. This is an admin required field and can be dynamically discovered from an existing /etc/passwd file or can be statically defined in an account template.

In step 609, the home directory is discovered. A home directory, also called a login directory, is the directory on Unix-like operating systems that serves as the repository for a user's personal files, directories and programs. It is also the directory that a user is first in after logging into the system. This directory is admin required. Similar to the above attributes, it can be dynamically discovered by analyzing home folder values corresponding to other accounts. On Linux/UX systems this information is typically present in /etc/passwd file. Alternatively, the home directory can be statically defined in an account template. The shell script value is discovered in step 611. A Shell Script is a series of commands written in plain text file similar to a batch file in MS-DOS. The shell script is admin required. In some embodiments of the invention it is dynamically discovered, but other embodiments define the shell script for a given target in account template statically.

In step 611, the password is determined. As discussed above, in most embodiments of the invention, it cannot be dynamically discovered and is resolved using a password policy. It is system required. In step 613, a set of secondary groups is discovered. The secondary groups are optional attributes which may or may not be set up in a given account profile. They can be used, for example, when granting access on the resource as required by user's organizational role. In one preferred embodiment, second groups are dynamically resolved from access request context. Thus, in one embodiment of the invention, upon identifying secondary groups in the existing account information, will attempt to determine whether the secondary group information should be used in the new account by determining whether the context of the current account request matches that of the existing account. In a second embodiment, the invention will determine from the current account request that secondary information is included. It will then find a "secondary group pattern" in existing accounts to include in the template.

When an identity solution is being deployed, many target instances will already have a number of accounts to be imported into the identity warehouse. By discovering how these existing accounts are set up, the information can be used to derive reasonable defaults for the values of a selected set of attributes for the new accounts on the new target. For example, the Linux account information stored in the identity warehouse comes from two key files at the target system: /etc/passwd and /etc/group. In other operating environments, other files will hold the best information to determine the account information pattern.

Entries in the /etc/passwd and /etc/group files follow a structured format. Below is an example entry in /etcpasswd file for user jtaylor:
/etc/passwd:
Example Value:
jtaylor:x:101:100:John Taylor,Office 253,(789)555-1234,(234)555-1122, jtaylor@acme.com:/home/jtaylor:/bin/sh
The ADP process will analyze the/etc/passwd entry and extract the following information:
user id: jtaylor
user numeric id: 101
user primary group id: 100
gecos: user first name, user last name,office nr,personal phone number, work phone number, user's email address
home folder: /home/jtaylor
shell script: /bin/sh
Below is an example of an entry for user jtaylor in the /etc/group file:
/etc/group
Example values: jtaylor: x:100:jtaylor developer:x:1002: jtaylor,dev backup:x:1003:j smith
From this file, the ADP process will extract the following information:
group name: developer
password placeholder (usually used only for privileged groups): x
group numeric id: 1002—managed entirely by target brokerage list of users belonging to the group: jtaylor, dev Next, the pattern recognition process will look for patterns in the different fields. By reverse engineering the user name field, it detects that it was based on user's real name: John Taylor, and that the pattern is to take the first initial of the user's first name and concatenate it to the entirety of the user's last name. Similarly, by analyzing the fields within the gecos value for an existing account, the attribute pattern discovery (APD) component determines what value patterns are used in them. To make the determination more reliable, account groups could be analyzed heuristically for account owners belonging to the same groups and roles as those requested for the new account owner. An alternative rule in some embodiments could be to find a significant set of existing users with account attribute values following the same pattern can provide hints about how the attribute values should look like on the new account.

As an example of how an embodiment of the invention is performed given the above, a user "Tom Smith" requests a new access for his backup application which requires a new account on the Linux target service with groups backup and developer. By discovering that the existing account jtaylor has a primary group 'jtaylor' equal to his user id value, the APD component finds that Tom Smith should have a primary group called 'tsmith'. By discovering that the existing account jtaylor has a secondary group 'developer', the APD component determines that patterns for gecos values discovered on jtaylor entry in/etc/passwd file should be applicable to Tom's new account as well. Alternatively, if there are no existing accounts assigned to group 'developer', the APD discovery looks at all accounts and determines the most frequently used patterns for the gecos fields.

This information may be useful during deployment phase to adjust UID policy for this target.

When the APD component discovers account attributes for a new account, there may be instances when the discovery of the full set of values for all account attributes is not possible. For example, the discovery process may not be able to determine value patterns for all gecos fields. In such cases, the system may need to throw an exception to notifying the parent APD process about the specific attribute and/or attribute field that it could not resolve. In a preferred embodiment, this exception should provide enough information for the administrator to research the required information on the target and take the corrective action.

Discovering Patterns for Account Default Values:

One set of rules that may be used to determine the patterns for various account attributes is shown in Table 1.

TABLE 1

Set of attribute discovery rules

| Account attribute name | Discovery rules for attribute value pattern |
|---|---|
| user id (pattern detection useful when defining or adjusting user id policy) | 1. presence of person.givenName or abbreviation<br>2. presence of person.sn or abbreviation<br>3. presence of user's preferred user ID (account.uid) if provided<br>4. presence of user ID from email address (person.mail) if provided<br>5. presence of the entire email address<br>6. presence of any punctuation marks which are not part of the user name or user ID<br>7. presence of any number which may indicate a counter used to guarantee uniqueness<br>8. maximum length of user ID<br>9. target specific rules |
| User primary group name | Given the primary group ID, the group name may be looked up from the/etc/group file.<br>This group name needs to be tested against patterns:<br>1. most commonly used primary group<br>2. user ID detected earlier<br>3. user's preferred ID (account.id) if provided<br>4. target specific rules |
| Account owner information (e.g., gecos) | Set of values defined in the target metadata used to describe the account owner. It may vary form one target type to another but it typically contains information such as:<br>1. User's full name (or application name, if the account is for a program)<br>2. Building and room number or contact person<br>3. Office telephone number<br>4. Other contact information (i.e. email address, employee no., etc.)<br>5. Each value tested against the most probable set of patterns matched against all relevant attribute values of the account owner (account.uid, person.givenName, person.sn, person.cn, erson.mail, person.businessPhoneNumber, person.homePhoneNumber, person.room)<br>6. Default for undetectable attribute, log information and insert a comma to preserve the order of all fields<br>7. Target specific ruless. |
| Home folder | 1. Existing accounts need to be analyzed to determine the most often used root home folder (i.e.: /home)<br>2. Pattern used for the user specific folder should be tested against: User ID detected earlier, user name, account.id, target specific rules. |
| Shell script | 1. Existing accounts associated with the same set of groups as those requested for the new account are analyzed to determine the most often used shell script command<br>2. If there is no existing account(s) associated with the exact set of accounts, all account entries area analyzed to find the most often used shell script value |

Those skilled in the art would appreciate that many variations on the above rules could be used within the scope of the invention.

After discovery of the pattern, it is transformed into a script expression describing the pattern used for the value. A set of example script expressions is shown in Table 2. In one preferred embodiment, the rule used for creating the script expression corresponds to the rule used for detecting the pattern. For example, if the pattern detected for the UID attribute is to the person.mail attribute from email address, the created expression will cause attribute discovery component to find the value for the person.mail attribute in the available user information at runtime.

The created script expression may be fed directly into a transient or a persistent account template. The 'person' and 'account' objects or values can be used by the script evaluator within the account template processor at runtime provide the values for the script expressions. Data for these objects is pre-generated, either from objects retrieved from the identity warehouse or other components of the IAM system or from system interaction with the user. This data is passed into the attribute discovery component so that the new account information can be generated.

TABLE 2

Examples of script expressions based on found attribute value patterns

| Account attribute name | Example of the discovered pattern (JavaScript) |
|---|---|
| User ID | person.givenName.substring(0,1) + person.sn.substring(0,7) |
| User primary group name | account.uid |
| Account owner information | person.cn + "," + "Office " + person.room + "," + person.businessPhoneNumber + "," + person.homePhoneNumber + "," + person.mail |
| Home folder | "/home/" + account.uid |
| Shell script | "/bin/sh" |

As shown in Table 2, the JavaScript expression, "person.givenName.substring(0,1)+person.sn.substring(0,7)" instructs the account creation engine to create a user name by combining the first letter of the user's first name with the first seven letters of the user's last name.

Figure 7A:
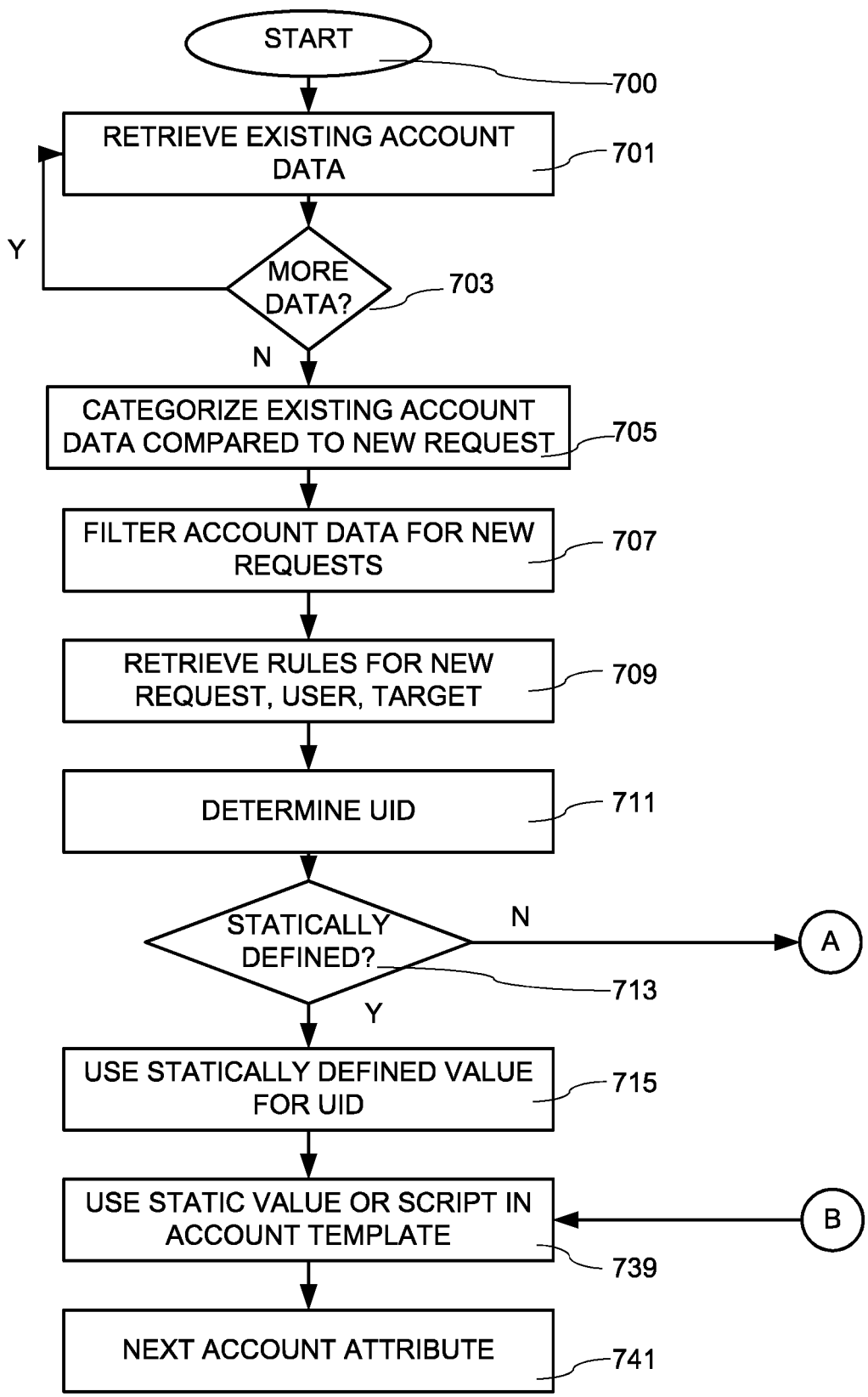
FIGS. 7A and 7B depict a more detailed process flow of the template generation process for the UID attribute for a preferred embodiment.
Figure 7B:
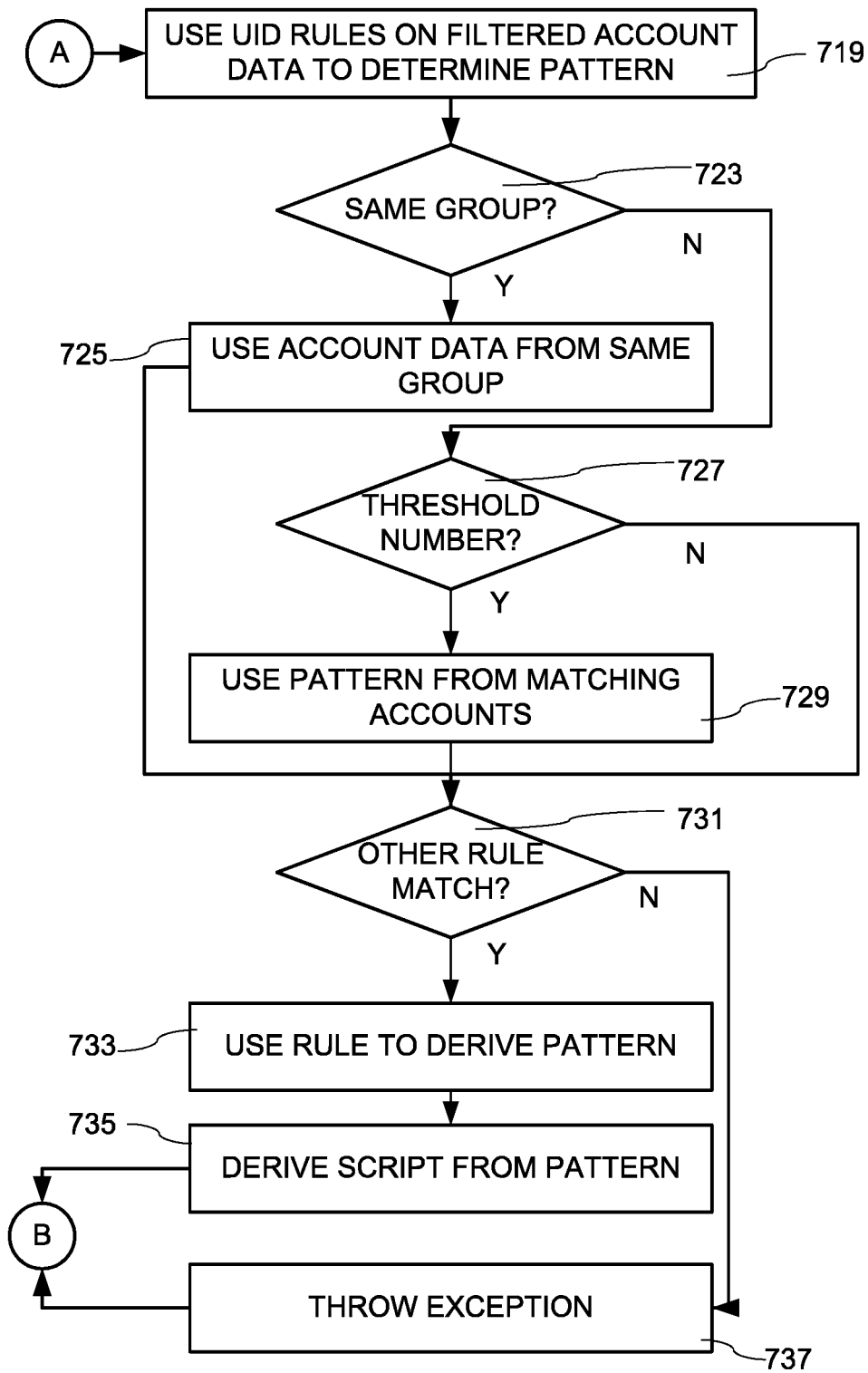

In FIGS. 7A and 7B, one embodiment of determining the UID pattern from existing account information and writing a complementary script expression is depicted as a flow diagram. The process is similar for other account attributes, although each attribute may have particular rules as shown in Table 1.

The process begins in step 701 where the existing account data is retrieved in response to a request for access to a new target by a new user. In one preferred embodiment, the data is retrieved from a central store like the inventory warehouse. The target may have existing users, and the user may have accounts at other target resources. However, the invention has particular application when a new system is being brought into the enterprise infrastructure for which autoprovisioning account templates have not been established by the system administrator. In one preferred embodiment, the particular account data files retrieved is part of system administrator configuration, e.g., by configuring the rule set, and may be dependent on the new target type. That is, in some embodiments, different account data files would be retrieved if a Linux system was the new target than if a mainframe system was the new target. In step 703, the process determines whether more account data is available or needed. In some embodiments, the account data may be distributed in multiple data stores, or alternatively, the process may be configured to determine that the retrieved information is adequate, and so, if available no more account data is required.

In step 705, the retrieved existing account data is compared to the user and target to determine the degree of match. Ideally, the retrieved account data would precisely match the user role and group, and be appropriate to the same target or target type. However, such account data may not be available and heuristics in the process would determine the best matches from the available account data. Based on the heuristics or filter rules, the retrieved account data would be filtered, step 707. The filtering step is an optional step as some embodiments of the invention may analyze all of the available data according to the rule set as described below, and based upon a ranking algorithm, select the best available pattern.

In step 709, the rules for analyzing the existing account data for the user ID are retrieved. In the drawing, each account attribute is analyzed sequentially. However, in other embodiments of the invention, all of the rules for other account attributes could be retrieved and the analysis proceed in parallel. These rules can be also be specific according to a target, e.g., a Linux server, or a role, e.g., a developer or administrator, or a group, e.g., sales or development. As will be discussed below, from the context of the user request and the account attribute for which the pattern will be derived, selection between the available rules is made in some embodiments of the invention. In other embodiments of the invention, all of the rules are used, and based on a degree of pattern match using one of the rules, preferably across multiple existing accounts, the best pattern is chosen. In step 711, the process for determining the user ID is initiated.

First, in step 713, a check is made to determine whether the user ID is statically defined, either by the system administrator or by virtue of the user possessing a system wide user ID for all targets. If so, in step 715, the statically defined value or expression for the user ID is used. If not, in step 719, the pattern definition process begins by analyzing the filtered account data with the selected rules (which may be all the rules for the user ID attribute). These rules can be specific according to a target, a role or group. So from the context of the user request and the account attribute for which the pattern will be derived, selection between the available rules is made in some embodiments of the invention. A history of successful rules can be stored and ranked, so that is a particular rule was successful for deriving an account pattern for a particular target type in the past, it would be one of the rules selected. The selection process is illustrated in FIG. 7 in one embodiment, however, one skilled in the art would recognize that other means of discriminating between rules is within the scope of the present invention.

In step 723, a determination is made whether there are existing accounts from other users having the same role or group membership. If so, in step 725, these accounts are used to derive the pattern. Another way of determining a pattern is to examine the group of retrieved accounts for patterns of account information. If a pattern is common between accounts, step 727, i.e. it reaches a threshold number or is a majority of the retrieved accounts, then that pattern can be used to generate the account template, step 729.

If there is not existing account data from users having similar roles or group membership as the requesting user, nor is there a threshold number of or majority of similar patterns, then the process uses other rules, such as those presented in Table 1 to determine a rule match to the retrieved accounts. This can be an iterative process wherein each rule is tested sequentially, or all rules can be tested against the retrieved accounts to determine which rule derives the most consistent pattern over a portion of or all of the retrieved account data. More than one rule can be used to find the best pattern. In this embodiment, if two rules yield the same pattern result, that pattern would be ranked higher than patterns which are found by only one rule. Once the rule(s) with the best match are established, they are used to derive the pattern.

In step 735, the ADP process uses the pattern to derive the script expression which will be part of the account template used to create the new account. If a pattern cannot be identified, in step 737, an exception is thrown. The user can be notified by an alert, but in the present embodiment an indicia of the exception is forwarded to be incorporated into the account template. When the account template is reviewed in a user interface, the user would see the account attributes which need to be manually determined, e.g., the user ID pattern.

Depending on the results of the ADP process, the statically defined attribute value, the script expression or the exception indicia is then incorporated into the account template, step 739. The process for the next account attributes is represented by step 741. The process for each account attribute would be similar to that shown in FIG. 7 for the user ID for one embodiment of the invention. Those skilled in the art would recognize that many variations on order or inclusion of respective process steps could be used in different embodiments of the invention. Once each of the dynamically or statically created attribute expressions or values (or exception) are assembled into the account template, in one preferred embodiment, the system administrator is afforded the opportunity to override or otherwise edit the individual attributes in the account template.

Figure 8:
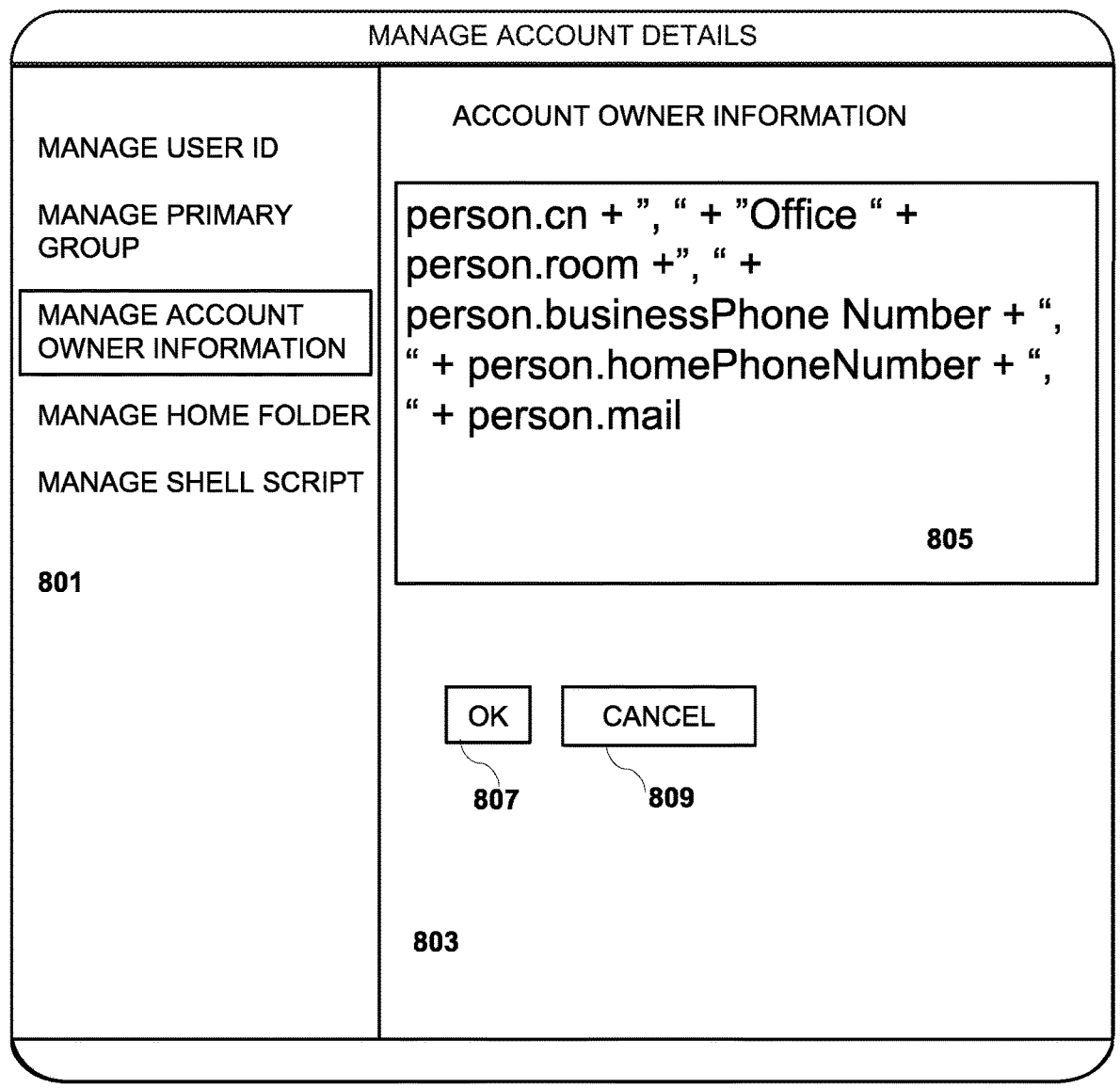
FIG. 8 is a representative display interface that may be used to facilitate user configuration of a generated template according to this disclosure.

A diagram showing administrator interface is depicted in FIG. 8. The left section of the interface 801 contains a set of options for editing the account template once created. In the drawing, the "manage account owner information" option is selected. In the right section of the interface 803, a window 805 is shown in which the administrator can edit the dynamically created script expression created for the account owner information, thereby substituting it for a statically created value. If satisfied with the expression, or after editing, the administrator can select the "OK" button 807. Or if the editing is not satisfactory, the editing process can be cancelled by selecting the "Cancel" button 809, Those skilled in the art understand that other embodiments of the invention could use other interfaces. One interface could display the entire newly created template account with all the script expressions rather than editing each attribute individually as shown in FIG. 8. In the editing window, a statically defined value for one account attribute might be shown, a dynamically created script expression for a second account attribute and) an exception indicia for a third attribute. Pop-up help could be provided on exception indicia to show the administrator what account attribute information was detected as well as an error report indicating why an exception was thrown.

The subject matter described herein has significant advantages over the prior art. Using the present invention, a team of system administrator does not need to manually discover and predefine account attribute defaults to enable auto-provisioning on every newly added managed target. The JAM system automatically discovers patterns of values used for all or selected required account attributes. The invention can be used to discover optional account attributes which may be in effect only for the current request. In one preferred embodiment, the discovered patterns are stored in a set of account templates for possible reuse on future targets. The invention is flexible. The system administrator can decide which account attributes should use the dynamic generation and which attributes should be statically defined in the account template. The patterns discovered on one target may be used on a newly deployed target of the same type with no existing account data.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, the "suspend and recertify" configuration tool, the administration page, or the workflow functions (or components thereof) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the suspension workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, identity access and management systems, as well as improvements to the functioning of recertification processes within such systems.

Having described our invention, what we now claim is as follows.

The invention claimed is:

1. A method for autoprovisioning a user account based on detected attribute patterns comprising:
retrieving a set of existing account information belonging to respective user accounts of a first set of users;
performing pattern matching, by a software module resident in a computer memory, on the retrieved set of existing account information to extract attribute information in the retrieved set of existing account information and on the extracted attribute information to discover a first attribute pattern;
generating an account template according to the first discovered attribute pattern;
using the generated account template to create a new account on a first target for a first user, the first user not a member of the first set of users; and
granting the first user access to the first target using the created new account.

2. The method as recited in claim 1, wherein generating an account template includes generating an expression for a respective account attribute, wherein the expression is evaluated at run time to provide an account value for the respective account attribute in the new account.

3. The method as recited in claim 2, further comprising:
responsive to user input, using a user specified attribute input for a selected attribute value in the account template.

4. The method as recited in claim 2, wherein the generated account template includes a set of dynamically generated expressions, and the method further comprises:
presenting the account template to an administrative user;
responsive to administrative user input, overriding one of the dynamically generated expressions with a statically defined input provided by the administrative user.

5. The method as recited in claim 1, further comprising:
determining a set of attributes for the first target;
selecting a rule from a set of rules for analyzing the retrieved set of existing account information according to the determined set of attributes; and
using the selected rule in the analyzing.

6. The method as recited in claim 1, wherein the set of existing account information is for a second target distinct from the first target.

7. The method as recited in claim 1, further comprising:
filtering the existing account information for existing account information for user accounts corresponding to users with role or group information similar to the first user to produce a filtered set of existing account information; and
analyzing the filtered set of existing account information to discover attribute patterns in the existing account information.

8. The method as recited in claim 1, wherein a plurality of attribute patterns is discovered for a respective account attribute and the method further comprises:
determining that a first discovered attribute pattern of the plurality of account attribute patterns is common to a threshold number of existing account information; and
selecting the first discovered attribute pattern for use for the creation of the account template.

9. The method as recited in claim 1, wherein the pattern matching includes using a respective set of rules to analyze the retrieved account information for a respective account attribute in the account template.

10. An apparatus, comprising:
a processor;
computer memory holding computer program instructions executed by the processor to reduce risk associated with recertification of an account having an access entitlement, the computer program instructions comprising:
program code operative to retrieve a set of existing account information belonging to respective user accounts of a first set of users;
program code operative to perform pattern matching on the retrieved set of existing account information to extract attribute information in the retrieved set of existing account information and on the extracted attribute information to discover a first attribute pattern;
program code operative to generate an account template according to the first discovered attribute pattern;
program code operative to use the generated account template to create a new account on a first target for a first user, the first user not a member of the first set of users; and
program code operative to grant the first user access to the first target using the created new account.

11. The apparatus as recited in claim 10 wherein the program code operative to generate an account template includes generating an expression for a respective account attribute, wherein the expression is evaluated at run time to provide an account value for the respective account attribute in the new account.

12. The apparatus as recited in claim 11, wherein the generated account template includes a set of dynamically generated expressions, and the apparatus further comprises:
program code operative to present the account template to an administrative user;
program code operative to administrative user input to override one of the dynamically generated expressions with a statically defined input provided by the administrative user.

13. The apparatus as recited in claim 10, further comprising:
program code operative to determine a set of attributes for the first target;
program code operative to select a rule from a set of rules for analyzing the retrieved set of existing account information according to the determined set of attributes; and
program code operative to use the selected rule in the analyzing.

14. The apparatus recited in claim 10, further comprising:
program code operative to filter the existing account information for existing account information for user accounts corresponding to users with role or group information similar to the first user to produce a filtered set of existing account information; and
program code operative to analyze the filtered set of existing account information to discover attribute patterns in the existing account information.

15. A computer program product in a non-transitory computer readable medium for use in a data processing system, the computer program product holding computer program instructions which, when executed by the data processing system, to reduce risk associated with recertification of an account having an access entitlement, the computer program instructions comprising:
   program code operative to retrieve a set of existing account information belonging to respective user accounts of a first set of users;
   program code operative to perform pattern matching on the retrieved set of existing account information to extract attribute information in the retrieved set of existing account information and on the extracted attribute information to discover a first attribute pattern;
   program code operative to generate an account template according to the first discovered attribute pattern;
   program code operative to use the generated account template to create a new account on a first target for a first user, the first user not a member of the first set of users; and
   program code operative to grant the first user access to the first target using the created new account.

16. The computer program product as recited in claim 15 wherein the program code operative to generate an account template includes generating an expression for a respective account attribute, wherein the expression is evaluated at run time to provide an account value for the respective account attribute in the new account.

17. The computer program product as recited in claim 16, wherein the generated account template includes a set of dynamically generated expressions, and the computer program product further comprises:
   program code operative to present the account template to an administrative user;
   program code operative to administrative user input to override one of the dynamically generated expressions with a statically defined input provided by the administrative user.

18. The computer program product as recited in claim 15, further comprising:
   program code operative to determine a set of attributes for the first target;
   program code operative to select a rule from a set of rules for analyzing the retrieved set of existing account information according to the determined set of attributes; and
   program code operative to use the selected rule in the analyzing.

19. The computer program product recited in claim 15, further comprising:
   program code operative to filter the existing account information for existing account information for user accounts corresponding to users with role or group information similar to the first user to produce a filtered set of existing account information; and
   program code operative to analyze the filtered set of existing account information to discover attribute patterns in the existing account information.

20. The computer program product as recited in claim 15, wherein the set of existing accounts are for a second target distinct from the first target.

* * * * *